United States Patent
Nakamura et al.

(10) Patent No.: US 9,811,067 B2
(45) Date of Patent: Nov. 7, 2017

(54) COIL SPRING MODELING APPARATUS AND METHOD OF THE SAME

(71) Applicants: NHK SPRING CO., LTD., Yokohama-shi, Kanagawa (JP); NHK INTERNATIONAL CORPORATION, Wixom, MI (US)

(72) Inventors: Takahiro Nakamura, Yokohama (JP); Kazuo Furukawa, Machida (JP); Senri Moriyama, Yokohama (JP); Ryuichi Sato, Yokohama (JP); Shinichi Nishizawa, Walled Lake, MI (US)

(73) Assignees: NHK SPRING CO., LTD., Kanagawa (JP); NHK INTERNATIONAL CORPORATION, Wixom, MI (US)

( * ) Notice: Subject to any disclaimer, the term of this patent is extended or adjusted under 35 U.S.C. 154(b) by 309 days.

(21) Appl. No.: 14/620,855

(22) Filed: Feb. 12, 2015

(65) Prior Publication Data
US 2016/0239004 A1    Aug. 18, 2016

(51) Int. Cl.
G05B 15/00    (2006.01)
G06F 7/48     (2006.01)
(Continued)

(52) U.S. Cl.
CPC .............. *G05B 17/02* (2013.01); *F16F 1/04* (2013.01); *F16F 2230/0017* (2013.01)

(58) Field of Classification Search
CPC ..................................................... G05B 15/02
(Continued)

(56) References Cited

U.S. PATENT DOCUMENTS 5,322,319 A * 6/1994 Tanaka ............... B60G 17/0165
                                                  280/5.503
5,390,948 A * 2/1995 Kuriki ............... B60G 17/0182
                                                  280/5.508
(Continued)

FOREIGN PATENT DOCUMENTS

JP    05281096 A    10/1993
JP    2007256019 A  10/2007

OTHER PUBLICATIONS

Nishizawa, et al., "Experimental Study on the Effect of Coil Spring Reaction Force Vector on McPherson Strut Suspension Characteristics", SAE 2014 World Congress & Exhibition, published Apr. 1, 2014, pp. 1-6.
(Continued)

*Primary Examiner* — Suresh Suryawanshi
(74) *Attorney, Agent, or Firm* — Holtz, Holtz & Volek PC (57) ABSTRACT

A coil spring modeling apparatus includes a first attachment member disposed on a lower spring seat, a second attachment member disposed on an upper spring seat, an actuator unit formed of a Stewart-platform-type parallel mechanism, a spring height detection mechanism, and a controller. The spring height detection mechanism is constituted of displacement gauges such as a linear variable differential transformer. These gauges are provided on hydraulic cylinders, and detect amounts of displacement relative to the reference lengths of the hydraulic cylinders, respectively. A hydraulic pressure supply device is controlled by the controller and supplies fluid pressure according to the displacement detected by the gauges to the respective hydraulic cylinders.

5 Claims, 8 Drawing Sheets

(51) Int. Cl.
    *G01M 17/00*     (2006.01)
    *G05B 17/02*     (2006.01)
    *F16F 1/04*     (2006.01)

(58) Field of Classification Search
    USPC .......................................................... 700/275
    See application file for complete search history.

(56) References Cited

U.S. PATENT DOCUMENTS

| | | | | |
|---|---|---|---|---|
| 5,489,115 | A * | 2/1996 | Osaki | B60G 17/018 280/5.515 |
| 7,110,926 | B2 * | 9/2006 | Nishizawa | B60G 15/00 702/113 |
| 7,434,458 | B2 * | 10/2008 | Nishizawa | B60G 15/00 703/7 |
| 7,606,690 | B2 | 10/2009 | Nishizawa et al. | |
| 8,214,184 | B2 | 7/2012 | Nishizawa et al. | |
| 9,406,411 | B2 * | 8/2016 | Sayeh | G21K 1/04 |
| 9,506,225 | B2 * | 11/2016 | Kim | E02F 9/2271 |
| 9,533,541 | B2 * | 1/2017 | Kim | F16K 31/0665 |
| 2003/0111309 | A1 | 6/2003 | Nishizawa et al. | |

OTHER PUBLICATIONS

Nishizawa, et al., "Experiments on Influence of Coil Spring Reaction Force Axis on Vehicle Characteristics, using 'Universal Springs'", Japan Society of Spring Engineers (JSSE) 2013 Autumn Lecture Meeting, published Nov. 1, 2013, pp. 21-24.

International Search Report (ISR) dated Apr. 19, 2016, issued in counterpart International Application No. PCT/JP2016/054012.

Nishizawa, et al., "Development of Programmable Force Line Generator for Coil Springs", (2005), No. 50, pp. 39-46.

Related U.S. Appl. No. 14/620,795, filed Feb. 12, 2015, First Named Inventor: Takahiro Nakamura, Title: "Coil Spring Modeling Apparatus".

Related U.S. Appl. No. 14/620,916, filed Feb. 12, 2015, First Named Inventor: Takahiro Nakamura, Title: "Coil Spring Modeling Apparatus and Method of the Same".

International Search Report (ISR) dated Aug. 18, 2016, issued in counterpart International Application No. PCT/JP2016/054012.

* cited by examiner

COIL SPRING MODELING APPARATUS AND METHOD OF THE SAME

BACKGROUND OF THE INVENTION

1. Field of the Invention

The present invention relates to a coil spring modeling apparatus capable of producing a reactive force (repulsive force) corresponding to compression of a helical spring such as a suspension coil spring, and a method of the same.

2. Description of the Related Art

As an example of a vehicle suspension system, a McPherson-strut-type suspension is known. The McPherson-strut-type suspension comprises a coil spring, and a strut (a shock absorber) provided inside of the coil spring. The coil spring is compressed by a load applied from above the coil spring, and is extended and retracted in accordance with the load. The strut is also extended and retracted.

In the McPherson-strut-type suspension, in order to reduce the sliding resistance of a strut, offsetting a force line position (FLP) of a coil spring from the center line of the coil spring is known. For example, the force line position (FLP) of a coil spring is set at a position where the friction of the strut is minimal. For this reason, the relationship between a force line position (FLP) of a coil spring and the sliding resistance of a strut must be specified. However, producing a variety of coil springs whose force line positions are different by way of trial is time consuming and costly. Thus, instead of using the coil spring, using a coil spring modeling apparatus has been proposed.

For example, a coil spring modeling apparatus disclosed in U.S. Pat. No. 7,606,690 (Document 1) is known. Also, an improved coil spring modeling apparatus is disclosed in "Research of Effect of Coil Spring Reaction Force Line on Vehicle Characteristics by Universal Spring" (Document 2), on pages 21 to 24 of the proceedings, presentation of which was made in the conference held by the Japan Society of Spring Engineers (in Nagoya) on Nov. 1, 2013, and "Experimental Study on the Effect of Coil Spring Reaction Force Vector on Suspension Characteristics" of SAE 2014 (Document 3), presentation of which was made in the U.S. (Detroit) on Apr. 8, 2014. The coil spring modeling apparatus disclosed in the above documents has a Stewart-platform-type parallel mechanism comprising six hydraulic cylinders. By actuating each of the hydraulic cylinders by fluid pressure, a reactive force corresponding to compression of a coil spring can be produced.

A coil spring has its length (deflection) changed in accordance with a compression load applied in the axial direction. The length (deflection) of a coil spring whose spring constant is invariable is increased in proportion to the load applied to the spring. Depending on the specification of a suspension comprising a coil spring, the characteristics (for example, the sliding resistance of a strut and a kingpin moment) may be changed in accordance with the change in length (the amount of compression) of the coil spring. Moreover, the spring constant is not necessarily invariable depending on the type of coil spring. For example, there exists a coil spring whose spring constant increases as the compression increases.

In the conventional coil spring modeling apparatuses disclosed in Documents 1 to 3, fluid having a constant pressure is always supplied to each of hydraulic cylinders in response to a load applied from above. Accordingly, each of the hydraulic cylinders always produces a constant reactive force in response to a load of compression applied from above. For this reason, a reactive force corresponding to the amount of compression cannot be produced in each of the hydraulic cylinders with the conventional coil spring modeling apparatus, and there is room for improvement to deal with the situation that the type of coil spring to be modeled is restricted.

BRIEF SUMMARY OF THE INVENTION

Accordingly, the present invention aims to provide a coil spring modeling apparatus capable of producing a reactive force corresponding to the amount of compression in each of the hydraulic cylinders, and modeling various coil springs and method of the same.

According to an embodiment of the present invention, a coil spring modeling apparatus provided on a strut, which comprises a lower spring seat and an upper spring seat, comprises: a first attachment member disposed on the lower spring seat; a second attachment member disposed on the upper spring seat; an actuator unit which is arranged between the first attachment member and the second attachment member, and extends and retracts; a spring height detection mechanism; and a controller. The spring height detection mechanism is configured to detect an amount of displacement with respect to a distance between the first attachment member and the second attachment member. The controller is configured to control the actuator unit according to the amount of displacement detected by the spring height detection mechanism.

An example of the actuator unit comprises a Stewart-platform-type parallel mechanism including six hydraulic cylinders arranged with their inclinations changed alternately between the first attachment member and the second attachment member. An example of the spring height detection mechanism comprises linear displacement gauges which are provided on the hydraulic cylinders, respectively. These displacement gauges detect amounts of displacement relative to reference lengths of the hydraulic cylinders, respectively. An example of the displacement gauge is a linear variable differential transformer (LVDT) comprising a plunger. Further, a guide rod which guides the linear motion of the plunger may be provided. Furthermore, a first inner load cell configured to detect an axial force applied to the lower spring seat and a moment about the axis, and a second inner load cell configured to detect an axial force applied to the upper spring seat and a moment about the axis should preferably be provided.

The coil spring modeling apparatus comprising the displacement gauges calculates vertical displacements relative to the reference heights, on the basis of the amounts of displacement of the respective hydraulic cylinders detected by the displacement gauges. A vertical load obtained by multiplying the vertical displacement by a spring constant is added to an initial vertical load. By controlling the fluid pressure of each of the hydraulic cylinders with this additional value, load control (control of reactive force) having the feature of spring constant is carried out likewise the actual coil spring.

According to the coil spring modeling apparatus of the present embodiment, a reactive force corresponding to the amount of compression can be produced in each of the hydraulic cylinders as in the case of an actual coil spring having a given spring constant. Thus, even if the actual coil spring is not used, a characteristic test equivalent to that performed in a suspension comprising a coil spring can be performed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
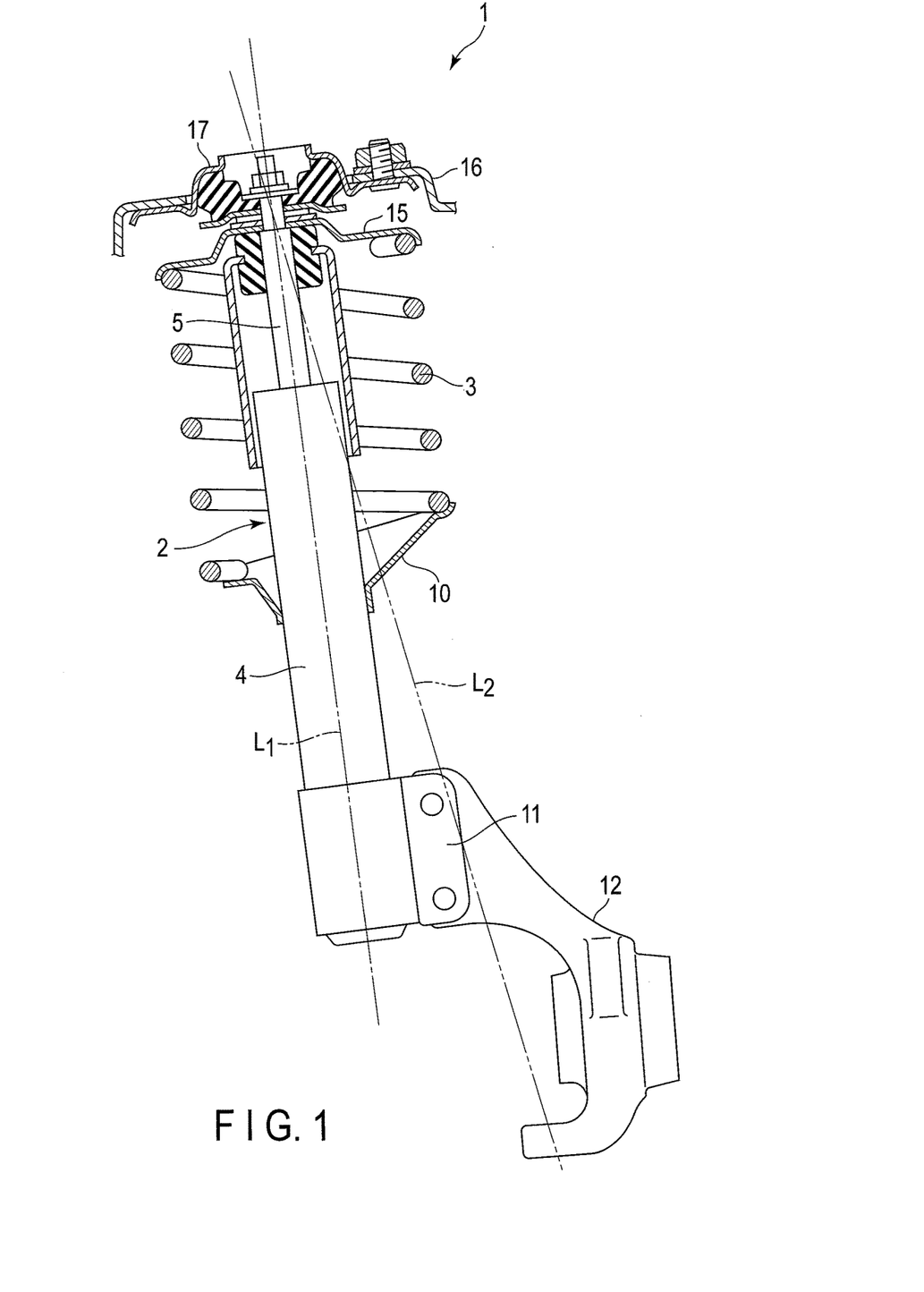
FIG. 1 is a cross-sectional view of a McPherson-strut-type suspension.

FIG. 1 shows a McPherson-strut-type suspension 1, which is an example of a suspension system used in vehicles. The suspension 1 comprises a shock absorber as a strut 2, and a suspension coil spring 3 (which is hereinafter simply referred to as a coil spring 3). The strut 2 comprises an outer tube 4 as a first strut element, and a rod 5 as a second strut element. The rod 5 is inserted into the outer tube 4. A damping force generation mechanism is provided at a distal end of the rod 5 inserted into the outer tube 4. The outer tube 4 and the rod 5 can be moved relatively along axis $L_1$ (strut axis).

The outer tube 4 is provided with a lower spring seat 10. At the lower end of the outer tube 4, a bracket 11 is provided. A knuckle member 12 is mounted on the bracket 11. A wheel axis is supported by the knuckle member 12, an upper spring seat 15 is provided near the upper end of the rod 5. A mount insulator 17 is provided between the upper spring seat 15 and a body member 16. When a steering operation is performed, the strut 2 is pivoted about kingpin axis $L_2$ by the steering control force input to the knuckle member 12. The coil spring 3 is provided in a state in which the coil spring 3 is compressed between the lower spring seat 10 and the upper spring seat 15.

Figure 2:
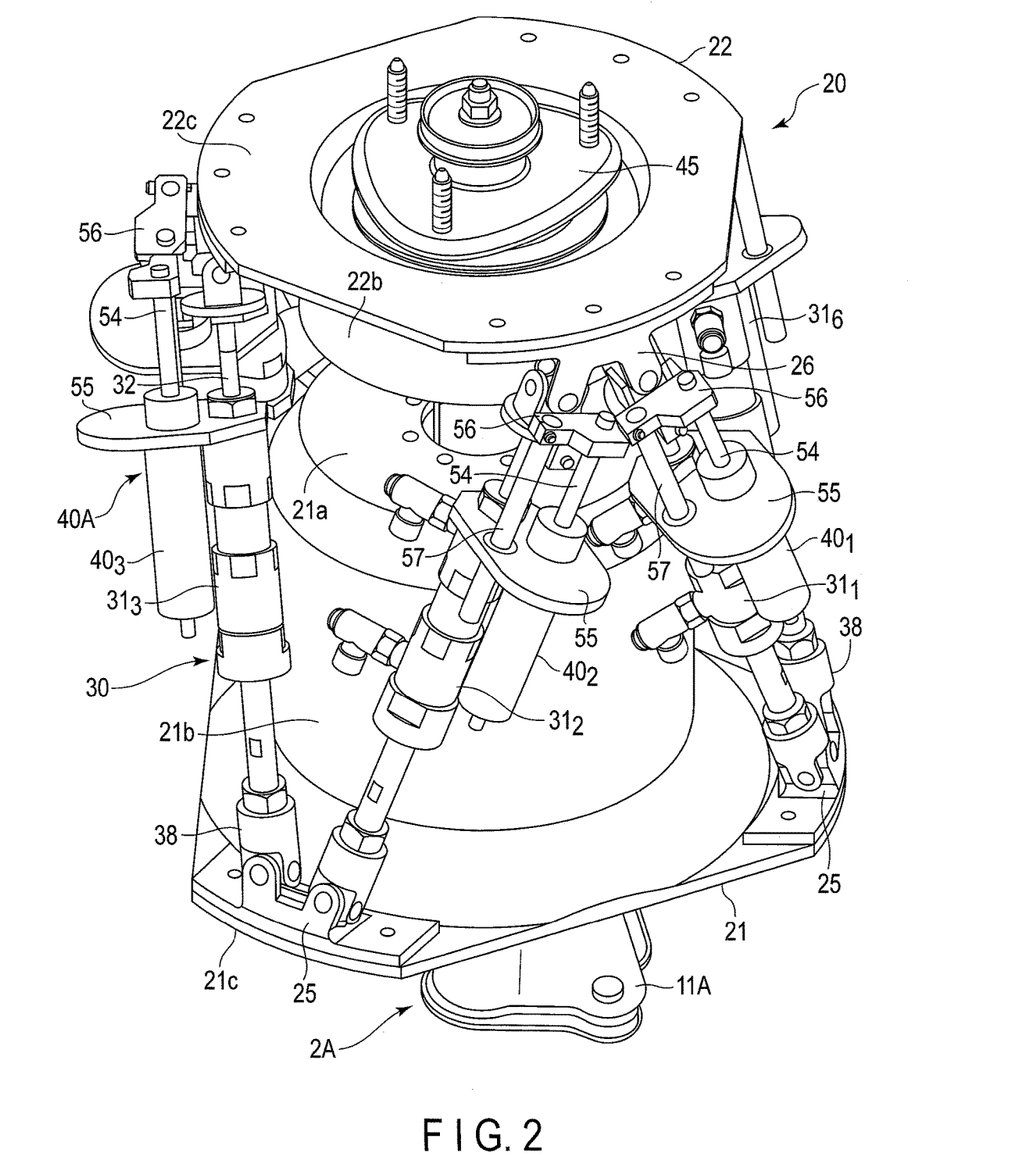
FIG. 2 is a perspective view of a coil spring modeling apparatus according to an embodiment.
Figure 3:
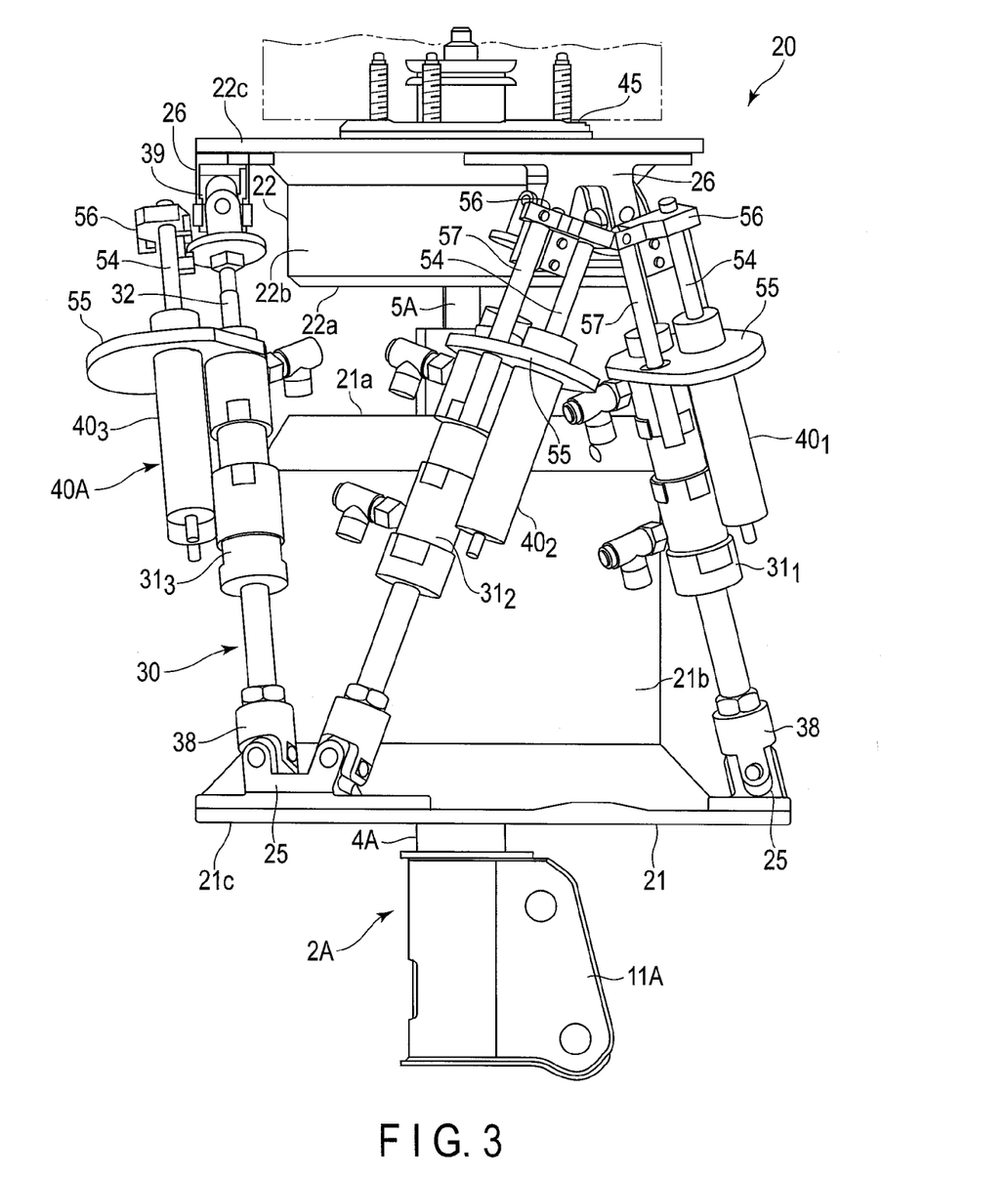
FIG. 3 is a side view of the coil spring modeling apparatus shown in FIG. 2.
Figure 4:
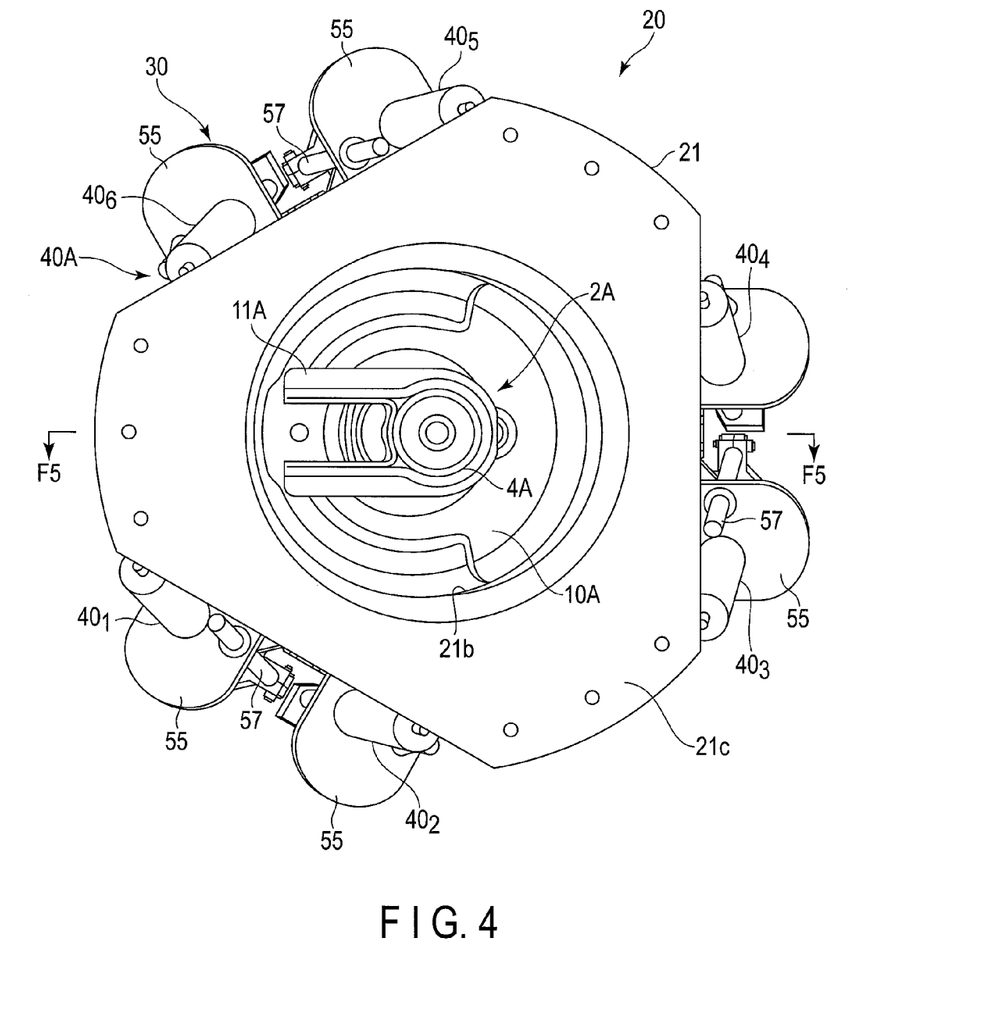
FIG. 4 is a bottom view of the coil spring modeling apparatus shown in FIG. 2.
Figure 5:
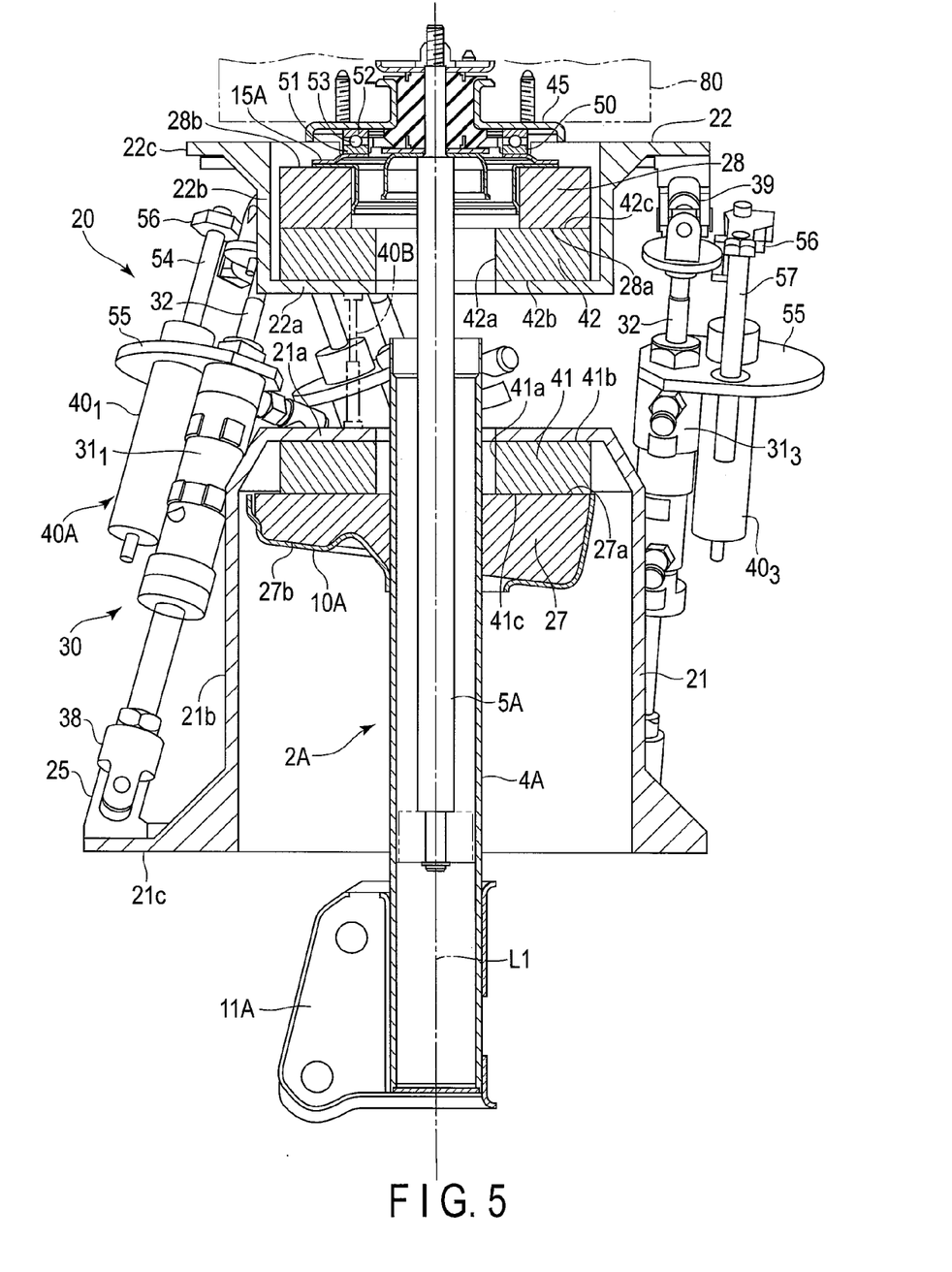
FIG. 5 is a cross-sectional view taken along line F5-F5 of FIG. 4.

A coil spring modeling apparatus 20 according to an embodiment will now be described with reference to FIGS. 2 to 8. FIG. 2 is a perspective view of the coil spring modeling apparatus 20. FIG. 3 is a side view of the coil spring modeling apparatus 20. FIG. 4 is a bottom view of the coil spring modeling apparatus 20. FIG. 5 is a cross-sectional view taken along line F5-F5 of FIG. 4.

A strut 2A (FIG. 5) which is used in the coil spring modeling apparatus 20 comprises an outer tube 4A as a first strut element, a rod 5A as a second strut element, a lower spring seat 10A, a bracket 11A, and an upper spring seat 15A. The lower spring seat 10A is attached to the outer tube 4A. The upper spring seat 15A is disposed near the upper end of the rod 5A above the lower spring seat 10A. The rod 5A can be moved along axis $L_1$ (strut axis) relative to the outer tube 4A.

The coil spring modeling apparatus 20 comprises a first attachment member 21, a second attachment member 22, a first seat adapter 27, a second seat adapter 28, an actuator unit 30 comprising a Stewart-platform-type parallel mechanism, a hydraulic pressure supply device 37, a first inner load cell 41, a second inner load cell 42, a base member 45, a rotation support mechanism 50, a controller 70, etc.

The first attachment member 21 is secured to the lower spring seat 10A. The first attachment member 21 comprises a first disk portion 21a disposed above the lower spring seat 10A, a first extending portion 21b having a cylindrical shape which extends downward from the first disk portion 21a, and a first flange portion 21c projecting outward from the lower end of the first extending portion 21b. That is, the first attachment member 21 is substantially shaped like a hat. A lower joint connection portion 25 is circumferentially provided at each of six places in the first flange portion 21c.

The second attachment member 22 is secured to the upper spring seat 15A. The second attachment member 22 comprises a second disk portion 22a disposed below the upper spring seat 15A, a second extending portion 22b having a cylindrical shape which extends upward from the second disk portion 22a, and a second flange portion 22c projecting outward from the upper end of the second extending portion 22b. That is, the second attachment member 22 is shaped like an upside-down hat. An upper joint connection portion 26 is circumferentially provided at each of six places in the second flange portion 22c.

The first seat adapter 27 is arranged on the lower spring seat 10A. The first seat adapter 27 is formed of a light alloy whose specific gravity is smaller than that of iron such as aluminum alloy, and has a flat upper surface 27a. A lower surface 27b of the first seat adapter 27 has a shape which fits into the lower spring seat 10A.

The second seat adapter 28 is arranged under the upper spring seat 15A. The second seat adapter 28 is also formed of a light alloy such as aluminum alloy, and has a flat lower surface 28a. An upper surface 28b of the second seat adapter 28 has a shape which contacts the upper spring seat 15A. The lower surface 28a of the second seat adapter 28 is parallel to the lower surface 27b of the first seat adapter 27.

The flange portion 21c of the first attachment member 21 is positioned below the lower spring seat 10A. The flange portion 22c of the second attachment member 22 is positioned above the upper spring seat 15A. The actuator unit 30 which extends and retracts by fluid pressure is arranged between these flange portions 21c and 22c. An example of the actuator unit 30 comprises a Stewart-platform-type parallel mechanism.

Figure 6:
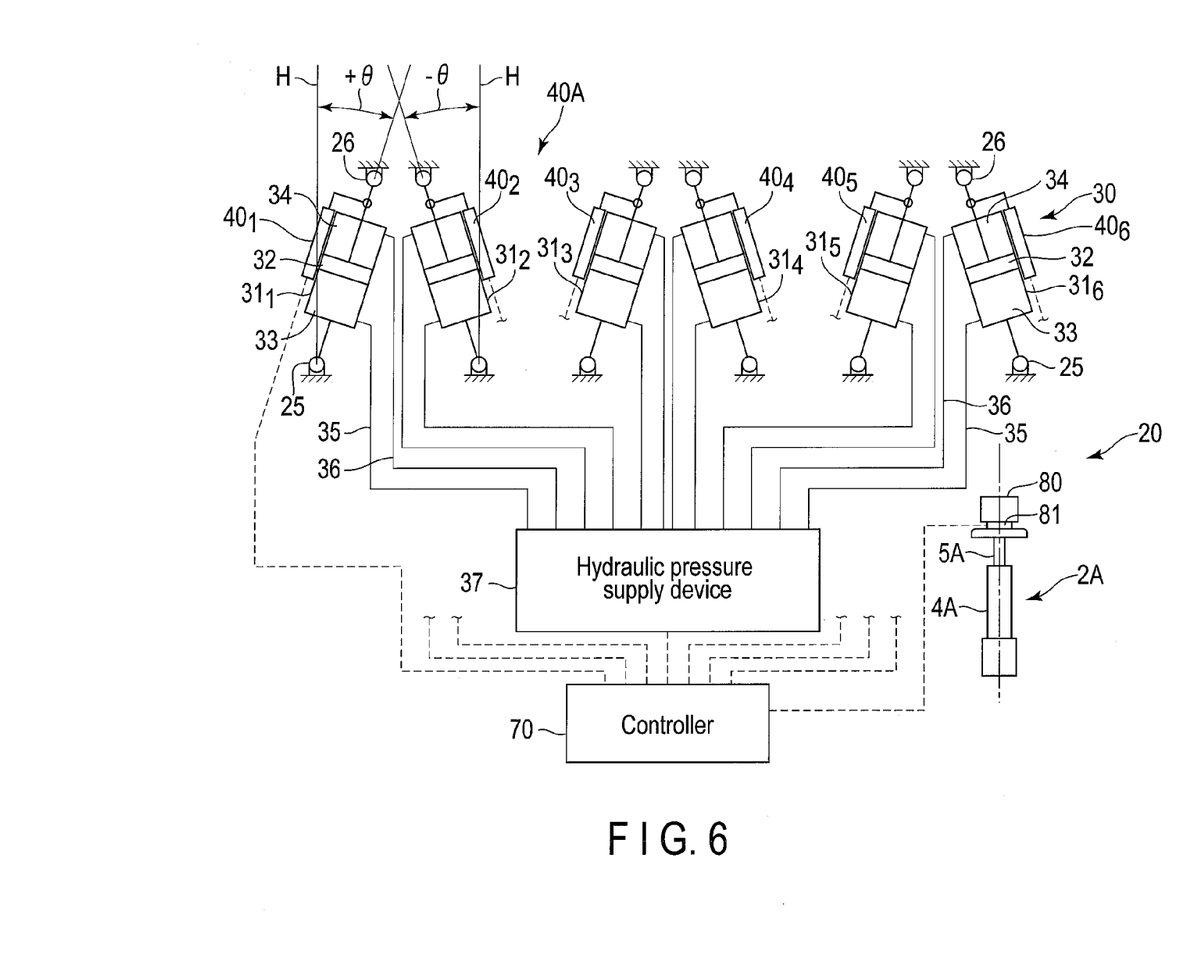
FIG. 6 is a block diagram showing a schematic structure of the coil spring modeling apparatus shown in FIG. 2.
Figure 7:
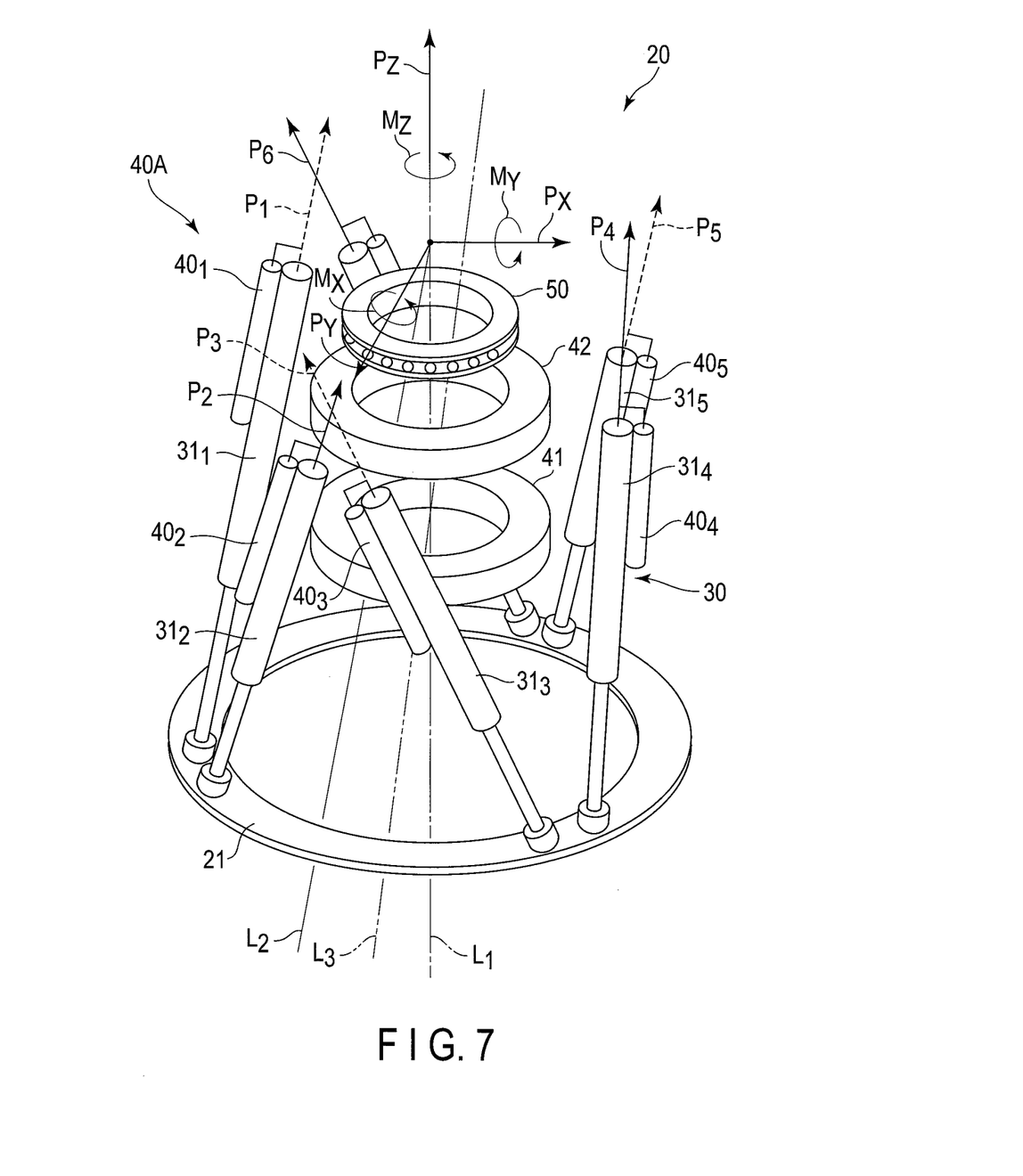
FIG. 7 is a perspective view schematically showing a part of the coil spring modeling apparatus shown in FIG. 2.

FIG. 6 is a block diagram showing the structure of the coil spring modeling apparatus 20. FIG. 7 is a perspective view which schematically shows a part of the coil spring modeling apparatus 20. The actuator unit 30 comprising the Stewart-platform-type parallel mechanism includes six hydraulic cylinders $31_1$ to $31_6$. These hydraulic cylinders $31_1$ to $31_6$ are arranged such that their inclinations are changed alternately, that is, the angles of adjacent hydraulic cylinders with respect to vertical line H (FIG. 6) are respectively +θ and −θ in turn.

Since the structures of the six hydraulic cylinders $31_1$ to $31_6$ are common to each other, the first hydraulic cylinder $31_1$ will be described as a typical example of the hydraulic cylinders. The hydraulic cylinder $31_1$ comprises a piston rod 32 actuated by fluid pressure (for example, oil pressure), a first hydraulic chamber 33 which moves the piston rod 32 in a first direction (the extending side), and a second hydraulic chamber 34 which moves the piston rod 32 in a second direction (the retracting side). The first hydraulic chamber 33 and the second hydraulic chamber 34 are connected to the hydraulic pressure supply device 37 via hoses 35 and 36, respectively.

The hydraulic cylinder $31_1$ can be moved to the extending side or the retracting side by supplying fluid pressure produced by the hydraulic pressure supply device 37 to the first hydraulic chamber 33 or the second hydraulic chamber 34. The lower end of the hydraulic cylinder $31_1$ is swingably connected to the joint connection portion 25 of the first attachment member 21 by a universal joint 38 typified by a ball joint. The upper end of the hydraulic cylinder $31_1$ is swingably connected to the joint connection portion 26 of the second attachment member 22 by a universal joint 39 typified by a ball joint.

In the hydraulic cylinders $31_1$ to $31_6$, linear displacement gauges $40_1$ to $40_6$ are provided, respectively. A spring height detection mechanism 40A is constituted of these displacement gauges $40_1$ to $40_6$. Since the structures of the displacement gauges $40_1$ to $40_6$ are common to each other, the first displacement gauge $40_1$ provided on the first hydraulic cylinder $31_1$ will be described as a typical example of the displacement gauges.

An example of the displacement gauge $40_1$ is a linear variable differential transformer (LVDT) comprising a plunger 54. The displacement gauge $40_1$ detects a linear displacement relative to a reference length of the hydraulic cylinder $31_1$ (a reference position of the piston rod 32). As other examples of the displacement gauge $40_1$, linear displacement gauges such as an optical linear encoder and a magnetic linear scale may be adopted. Alternatively, a linear displacement gauge based on other detection principles may be adopted.

The displacement gauge $40_1$ is mounted on the hydraulic cylinder $31_1$ by a mounting plate 55. The plunger 54 of the displacement gauge $40_1$ is connected to a distal end of the piston rod 32 of the hydraulic cylinder $31_1$ by means of a coupling member 56. A guide rod 57 is inserted into the mounting plate 55. The guide rod 57 is connected to the plunger 54 by the coupling member 56. The piston rod 32, the plunger 54, and the guide rod 57 move along the axis of the hydraulic cylinder $31_1$ in a state where they are kept parallel to one another. The guide rod 57 guides linear motion of the piston rod 32 and the plunger 54. Note that since the structures of the other displacement gauges $40_2$ to $40_6$ have commonalities with the first displacement gauge $40_1$, common reference numbers are assigned to common parts in FIGS. 2 to 5.

The first inner load cell 41 is arranged between the disk portion 21a of the first attachment member 21 and the first seat adapter 27. The first inner load cell 41 is accommodated within the first attachment member 21, and is disposed above the lower spring seat 10A. The first inner load cell 41 comprises a through-hole 41a into which the outer tube 4A is inserted, a flat upper surface 41b which contacts a lower surface of the first disk portion 21a, and a flat lower surface 41c which contacts the upper surface 27a of the first seat adapter 27, and has an annular shape as a whole. The first inner load cell 41 is secured to the first seat adapter 27 such that the upper surface 41b and the lower surface 41c of the first inner load cell 41 are perpendicular to axis $L_1$.

The first inner load cell 41 is arranged coaxially with the rotation support mechanism 50, that is, the center of the inner load cell 41 conforms to axis $L_1$. The first inner load cell 41 detects the axial force acting on the upper surface 27a of the first seat adapter 27, and a moment about the axis. The first inner load cell 41 can rotate about axis $L_1$ together with the outer tube 4A, the lower spring seat 10A, the first seat adapter 27, and the first attachment member 21.

The second inner load cell 42 is arranged between the disk portion 22a of the second attachment member 22 and the second seat adapter 28. The second inner load cell 42 is accommodated within the second attachment member 22, and is disposed below the upper spring seat 15A. The second inner load cell 42 comprises a through-hole 42a into which the rod 5A is inserted, a flat lower surface 42b which contacts an upper surface of the second disk portion 22a, and a flat upper surface 42c which contacts the lower surface 28a of the second seat adapter 28, and has an annular shape as a whole. The second inner load cell 42 is secured to the second seat adapter 28 such that the lower surface 42b and the upper surface 42c of the second inner load cell 42 are perpendicular to axis $L_1$.

Like the first inner load cell 41, the second inner load cell 42 is arranged coaxially with the rotation support mechanism 50, that is, the center of the inner load cell 42 conforms to axis $L_1$. The second inner load cell 42 detects the axial force acting on the lower surface 28a of the second seat adapter 28, and a moment about the axis. The second inner load cell 42 can rotate about axis $L_1$ together with the upper spring seat 15A, the second attachment member 22, and the second seat adapter 28.

The rotation support mechanism 50 is disposed between the upper spring seat 15A and the base member 45. The rotation support mechanism 50 rotatably supports the actuator unit 30 about axis $L_1$ with respect to the base member 45. An example of the rotation support mechanism 50 is a ball bearing, and the rotation support mechanism 50 comprises a lower ring member 51, an upper ring member 52, and a plurality of rolling members 53 accommodated between these ring members 51 and 52. The lower ring member 51 is disposed on an upper surface of the upper spring seat 15A. The upper ring member 52 is disposed on a lower surface of the base member 45.

The operation of the coil spring modeling apparatus 20 will now be described.

The actuator unit 30 comprising the Stewart-platform-type parallel mechanism forms a field of arbitrary force of six degrees of freedom by combining axial forces $P_1$ to $P_6$ shown in FIG. 7. That is, of vectors of force produced by six hydraulic cylinders $31_1$ to $31_6$, a resultant of components along axis $L_1$ constitutes a reactive force corresponding to that of a coil spring. For example, if a value obtained by combining the six axial forces $P_1$ to $P_6$ is positive, an upward force $P_Z$ along axis $L_1$ is produced.

When the actuator unit 30 is compressed between the lower spring seat 10A and the upper spring seat 15A, of vectors of force produced by the six hydraulic cylinders $31_1$ to $31_6$, an axial force is applied to the lower spring seat 10A. In this case, three orthogonal axial forces ($P_X$, $P_Y$, $P_Z$) with respect to the coordinate system of FIG. 7, and three moments ($M_X$, $M_Y$, $M_Z$) are produced. A six-component force ($P_X$, $P_Y$, $P_Z$, $M_X$, My, Mz) applied to the lower spring seat 10A is detected by the first inner load cell 41 and input to the controller 70 (FIG. 6). Further, a six-component force applied to the upper spring seat 15A is detected by the second inner load cell 42 and input to the controller 70. Based on these six-component forces, reactive force central position (load axis) $L_3$ is calculated.

Also, a total of moments that the six axial forces $P_1$ to $P_6$ have an effect on around axis $L_1$ constitutes moment $M_Z$ about axis $L_1$. For example, in FIG. 7, if the total of forces produced by three hydraulic cylinders $31_1$, $31_3$, and $31_5$ (i.e., the axial forces that produce the positive moment $M_Z$) is greater than the total of forces of the other three hydraulic cylinders $31_2$, $31_4$, and $31_6$ (i.e., the axial forces that produce the negative moment $M_Z$), moment $M_Z$ having a positive value is produced at an upper end of the actuator unit 30 (the upper spring seat 15A). That is, components around the axes of vectors of forces produced by the six hydraulic cylinders $31_1$ to $31_6$ correspond to the moment ($M_Z$) about axis $L_1$. Also at kingpin axis $L_2$, a moment (a kingpin moment) about kingpin axis $L_2$ is produced by the effect of the six-component force. Accordingly, it is possible to measure the moment about kingpin axis $L_2$ while changing the six-component force by the actuator unit 30.

The displacement gauges $40_1$ to $40_6$ detect amounts of displacement relative to the reference lengths of the hydraulic cylinders $31_1$ to $31_6$, respectively. Further, the hydraulic pressure supply device 37 supplies fluid pressure corresponding to the amounts of displacement detected by the displacement gauges $40_1$ to $40_6$ to the hydraulic cylinders $31_1$ to $31_6$, respectively. Since the structures of the displacement gauges $40_1$ to $40_6$ are common to each other, the first displacement gauge $40_1$ provided on the first hydraulic cylinder $31_1$ will be described as a typical example of the displacement gauges.

An output of the displacement gauge $40_1$ is input to the controller 70. The controller 70 calculates a vertical displacement relative to the reference height of the hydraulic cylinder $31_1$ based on the amount of displacement of the hydraulic cylinder $31_1$ detected by the displacement gauge $40_1$. A vertical load obtained by multiplying the vertical displacement by a spring constant is added to an initial vertical load. By controlling the fluid pressure of the hydraulic cylinder $31_1$ with this additional value, load control (control of reactive force) having the feature of spring constant is carried out likewise the actual coil spring.

Figure 8:
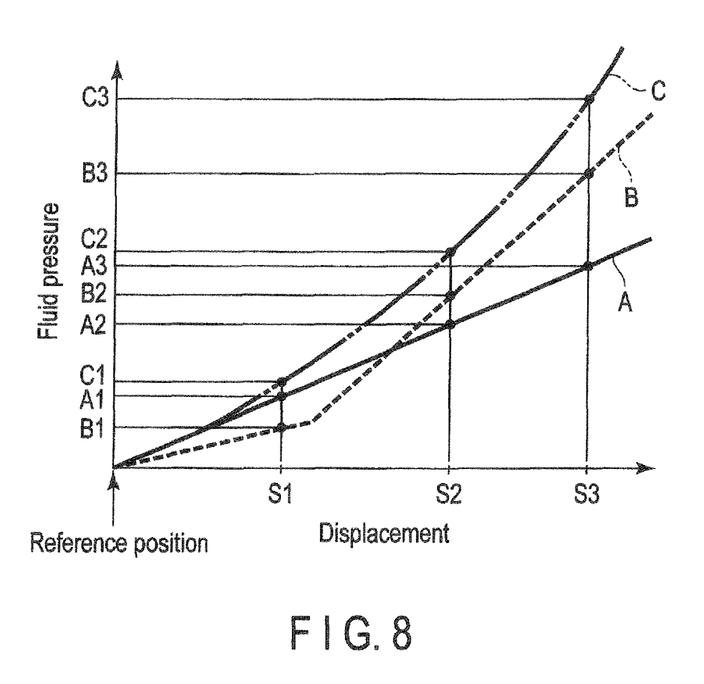
FIG. 8 is a graph showing the relationship between the amount of displacement and the fluid pressure of a hydraulic cylinder.

For example, if the spring constant is invariable (i.e., if the spring has linear characteristics), when displacement amount S1 is detected, fluid pressure A1 is supplied to the hydraulic cylinder $31_1$, as shown in line A in FIG. 8. When displacement amount S2 is detected as the load is increased, fluid pressure A2 (A2>A1) is supplied to the hydraulic cylinder $31_1$.

When displacement amount S3 is detected as the load is further increased, fluid pressure A3 (A3>A2) is supplied to the hydraulic cylinder $31_1$.

If the spring constant is variable and changes progressively with knee (i.e., if the spring has non-linear characteristics), when displacement amount S1 is detected, fluid pressure B1 is supplied to the hydraulic cylinder $31_1$, as shown in line B in FIG. 8. When displacement amount S2 is detected as the load is increased, fluid pressure B2 (B2>B1) is supplied to the hydraulic cylinder $31_1$. When displacement amount S3 is detected as the load is further increased, fluid pressure B3 (B3>B2) is supplied to the hydraulic cylinder $31_1$.

If the spring constant is variable and changes progressively (i.e., if the spring has non-linear characteristics), when displacement amount S1 is detected, fluid pressure C1 is supplied to the hydraulic cylinder $31_1$, as shown in line C in FIG. 8. When displacement amount S2 is detected as the load is increased, fluid pressure C2 (C2>C1) is supplied to the hydraulic cylinder $31_1$. When displacement amount S3 is detected as the load is further increased, fluid pressure C3 (C3>C2) is supplied to the hydraulic cylinder $31_1$.

As can be seen, the coil spring modeling apparatus 20 of the present embodiment performs the load control (control of reactive force) having the feature of spring constant likewise the actual coil spring, on the basis of the amounts of displacement of the hydraulic cylinder $31_1$ to $31_6$ detected by the displacement gauges $40_1$ to $40_6$, respectively. As another embodiment of the spring height detection mechanism, a liner displacement gauge 40B shown by a two-dot chain line in FIG. 5 may be arranged between the attachment members 21 and 22, and a vertical displacement may be directly detected by this liner displacement gauge 40B.

A performance test of the strut 2A (for example, measurement of the sliding resistance of the strut 2A and the kingpin moment) can be performed by using the coil spring modeling apparatus 20 of the present embodiment. FIGS. 5 and 6 show reference number 80, which represents a part of a load testing machine. A predetermined load is applied to the coil spring modeling apparatus 20 by the load testing machine. Since the distance between the lower spring seat 10A and the upper spring seat 15A is reduced by the load, a vertical reaction is produced. While this vertical reaction is being produced, the base member 45 is moved vertically with, for example, vertical strokes of ±5 mm, and a rectangular waveform of 0.5 Hz, and the load is measured by an external load cell 81. The frictional force produced in the strut 2A can be evaluated as a half of the value of hysteresis of the measured load.

When a moment (Mz) about axis $L_1$ is produced between the lower spring seat 10A and the upper spring seat 15A by controlling the fluid pressure supplied to each of the hydraulic cylinders $31_1$ to $31_6$, a kingpin moment (KPM) is produced in accordance with a geometric positional relationship between axis $L_1$ and kingpin axis $L_2$. The actuator unit 30 is supported by the rotation support mechanism 50. The friction of the rotation support mechanism 50 affects the magnitude of the kingpin moment (KPM). In a state where a predetermined vertical reaction is produced between the lower spring seat 10A and the upper spring seat 15A, a kingpin moment (KPM) which has been produced is detected.

It should be noted that the coil spring modeling apparatus according to the embodiment of the present invention can be applied to other types of suspension system having a strut, i.e., suspension systems other than the McPherson-strut-type suspension. The actuator unit is not limited to a Stewart-platform-type parallel mechanism, and any actuator unit comprising a hydraulic or pneumatic cylinder which extends and retracts by pressure of a fluid (liquid or gas) may be adopted. As other examples of the actuator unit, a linear actuator including a ball screw and a servo motor, or a differential-transformer-type linear actuator may be adopted. Further, needless to say, the structure, form, and arrangement or the like of each of the elements which constitutes the coil spring modeling apparatus, such as the first and second attachment members, the displacement gauge which constitutes the spring height detection mechanism, and the hydraulic pressure supply device, may be modified variously in implementing the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coil spring modeling apparatus provided on a strut comprising a lower spring seat and an upper spring seat, the coil spring modeling apparatus comprising:
   a first attachment member disposed on the lower spring seat;
   a second attachment member disposed on the upper spring seat;
   an actuator unit which comprises a plurality of hydraulic cylinders arranged with their inclinations changed alternately between the first attachment member and the second attachment member, and which extends and retracts;
   a spring height detection mechanism configured to detect an amount of displacement with respect to a distance between the first attachment member and the second attachment member, the spring height detection mechanism comprising displacement gauges each of which is provided on a respective one of the hydraulic cylinders and each of which detects an amount of displacement relative to a reference length of its respective one of the hydraulic cylinders; and
   a controller configured to control each of the hydraulic cylinders of the actuator unit according to the amount of displacement detected by each of the displacement gauges of the spring height detection mechanism.

2. The apparatus of claim 1, wherein the actuator unit comprises a Stewart-platform-type parallel mechanism including six hydraulic cylinders as the hydraulic cylinders.

3. The apparatus of claim 1, wherein each of the displacement gauges is a linear variable differential transformer comprising a plunger, and the apparatus further comprises a guide rod which is arranged parallel to the plunger and guides a linear motion of the plunger.

4. The apparatus of claim 1, further comprising a first inner load cell configured to detect an axial force applied to the lower spring seat and a moment about the axis, and a second inner load cell configured to detect an axial force applied to the upper spring seat and a moment about the axis.

5. A method of controlling a coil spring modeling apparatus, the coil spring modeling apparatus comprising (i) hydraulic cylinders arranged with their inclinations changed alternately between a first attachment member disposed on a lower spring seat and a second attachment member disposed on an upper spring seat, and (ii) displacement gauges each of which is provided on a respective one of the hydraulic cylinders and each of which detects an amount of displacement relative to a reference length of its respective one of the hydraulic cylinders, and the method comprising:
   detecting an amount of displacement relative to the reference length of each of the hydraulic cylinders by the respective displacement gauges; and
   supplying fluid pressure according to the detected amount of displacement to each of the hydraulic cylinders.

* * * * *